US012657687B2

(12) United States Patent
Ng et al.

(10) Patent No.: US 12,657,687 B2
(45) Date of Patent: Jun. 16, 2026

(54) APPARATUS AND METHOD FOR GENERATING RANDOM IMAGES OF A HERBAL FORMULATION

(71) Applicant: Logistics and Supply Chain MultiTech R&D Centre Limited, Pok Fu Lam (HK)

(72) Inventors: Wang Fei Ng, Pok Fu Lam (HK); Hiu Yan Yeung, Pok Fu Lam (HK); Wing Leung Chow, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 294 days.

(21) Appl. No.: 18/606,228

(22) Filed: Mar. 15, 2024

(65) Prior Publication Data

US 2025/0292392 A1 Sep. 18, 2025

(51) Int. Cl.
*G06T 7/00* (2017.01)
(52) U.S. Cl.
CPC .. *G06T 7/0008* (2013.01); *G06T 2207/10004* (2013.01); *G06T 2207/20081* (2013.01); *G06T 2207/30188* (2013.01)
(58) Field of Classification Search
CPC ......... G06T 7/0008; G06T 2207/10004; G06T 2207/20081; G06T 2207/30188
USPC ........................................................ 382/110
See application file for complete search history.

(56) References Cited

PUBLICATIONS

Lloyd, Richard, Hayley Stewart, and Donald Bailey. "Slowly dissolving particles in instant whole milk powder—Characterisation and quantitative analysis." International dairy journal 97 (2019): 65-70. (Year: 2019).*
Muzzio, Fernando J., et al. "Sampling practices in powder blending." International journal of pharmaceutics 155.2 (1997): 153-178. (Year: 1997).*
Jiang, Ying, et al. "Autonomous biomimetic solid dispensing using a dual-arm robotic manipulator." Digital Discovery 2.6 (2023):1733-1744. (Year: 2023).*
O'Shea, N., et al. "Reconstituting infant formula powder using a collaborative robot 'CoBoT' to mimic human biomechanical movements." Innovative Food Science & Emerging Technologies 67 (2021): 102562. (Year: 2021).*

* cited by examiner

*Primary Examiner* — Jonathan S Lee
(74) *Attorney, Agent, or Firm* — Renner, Kenner, Greive, Bobak, Taylor & Weber

(57) ABSTRACT

A method and an apparatus for generating random images of a herbal formulation includes: a container to hold a herbal formulation, a sweeper tool moveable in multiple degrees of freedom, a controller operatively coupled to the sweeper tool and configured to control the movement of the sweeper tool, a camera positioned to capture an image of the herbal formulation within the container, wherein in use, the sweeper tool is moveable within the container based on one or more randomly generated movement patterns to agitate the herbal formulation within the container, and; wherein the camera is controlled to capture an image of the herbal formulation within the container after the sweeper tool has stopped moving.

20 Claims, 5 Drawing Sheets

Top view of container

Side view of container

APPARATUS AND METHOD FOR GENERATING RANDOM IMAGES OF A HERBAL FORMULATION

FIELD OF THE INVENTION

The present invention relates to an apparatus and method for generating random images of a herbal formulation. In particular, the present invention relates to an apparatus and method for generating random images, where the random images can be used to train a computer model for recognising Traditional Chinese Medicine (TCM) formulations.

BACKGROUND OF THE INVENTION

Traditional Chinese Medicine (TCM) is a medicinal, health and wellness system developed in China. The system was developed in ancient China and is still practiced today in China and other parts of the world. TCM practitioners use various psychological and/or physical approaches to address health problems. One of the basic tenets is that the body's qi is circulating through channels called meridians having branches connected to bodily organs and functions. TCM generally includes a variety of therapies such as acupuncture, cupping therapy, gua sha, massage (e.g., tui na), qigong or tai chi, dietary therapy, and herbal medicine.

Herbal medicine is an important aspect of TCM. TCM herbal medicine practice includes use of plant elements as well as non-botanic substances such as animal, fungi, mineral products etc. There are several thousand compounds used and over 100,000 TCM recipes or formulations recorded. TCM practitioners (i.e., TCM clinicians) dispense various herbal formulations. These formulations comprise one or more TCM compounds that are processed in appropriate ways.

It is challenging to recognise or identify TCM formulations by eye. Therefore, some computer models e.g., AI models have been developed to automatically recognise and classify TCM formulations. Object recognition by processing images is a common task computer models can be trained to perform. To use a computer model e.g., an AI model to recognise a TCM formulation from a photo, the AI model is required to be trained with several images, often hundreds or thousands of images. TCM formulations can vary in many aspects depending on the processing techniques applied to the constituent ingredients. The images for a training dataset to train a computer model to recognise the type of TCM formulation from an image should include images of TCM formulations in various aspects e.g., patterns, scenarios, quantities, shapes etc. The training dataset should include images of TCM formulations in as many different aspects as can occur in practice.

Creating a large and varied training dataset is challenging and time consuming. Creating a training dataset of TCM formulation images often involves manually capturing several photos (e.g., hundreds of photos). This process can be time-consuming and mundane. Additionally, manually taking images to create a dataset can result in a less robust and less varied dataset, which can then result in poorly trained computer models

SUMMARY OF THE INVENTION

The present invention relates to an apparatus and method for generating random images of a herbal formulation. The apparatus and method of the present invention may be used to generate random images of multiple herbal formulations.

In particular, the present invention relates to an apparatus and method for generating random images of Traditional Chinese Medicine (TCM) formulations. The random images can be used to train a computer model for recognising Traditional Chinese Medicine (TCM) formulations. The apparatus for generating random images is an automated apparatus that is controlled to automatically generate random images of TCM formulations. The method for generating random images may be an automated method executed by the apparatus or by components of the apparatus to automatically capture images (i.e., photos) of TCM formulations.

In accordance with a first aspect, the present invention relates an apparatus for generating random images of a herbal formulation comprising:

a container to hold a herbal formulation, a sweeper tool moveable in multiple degrees of freedom, a controller operatively coupled to the sweeper tool and configured to control the movement of the sweeper tool, a camera positioned to capture an image of the herbal formulation within the container, wherein in use, the sweeper tool is moveable within the container based on one or more randomly generated movement patterns to agitate the herbal formulation within the container, and;

wherein the camera is controlled to capture an image of the herbal formulation within the container after the sweeper tool has stopped moving.

In one example the apparatus for generating random images of a herbal formulation comprises a vibrator, wherein the vibrator being attached to the container and configured to vibrate the container to agitate or move or vibrate the herbal formulation within the container.

In one example the vibrator is controlled to vibrate the container in a random pattern.

In one example, the vibrator may vibrate the container such that the container moves about at least two or three axes. In an alternate example vibrator may move the container along one axis.

In one example the vibrator is controlled to randomly vibrate the container. The vibrator may randomly vibrate the container when the vibrator is actuated.

In one example the apparatus comprises a plurality of vibrators, the vibrators are operatively coupled to the controller, and the controller is configured to control the vibrators to operate independently to generate different patterns of vibrations that are applied to the container to agitate the herbal formulation with the container.

In one example the camera is configured to capture multiple images of the herbal formulation, the camera being configured to capture an image each time after the sweeper tool has moved according to the randomly generated motion pattern such that the captured images are random images.

In one example the vibrator may be activated for a predefined time such that the container is vibrated for a predefined time. The predefined time may be a random time selected from within a predefined time range, wherein the predefined time range includes a minimum time and a maximum time. In another example, the predefined time may be user set.

In one example the apparatus comprises a memory unit or a database stored in a memory unit. The captured images are stored in the database.

In one example the controller is operatively coupled to the vibrator, and wherein the vibrator is controlled to vibrate the container to generate a herbal formulation pattern.

In one example the movement patterns define a predetermined shape, and the sweeper tool is moved in a predetermined shape. The sweeper tool may be moved within the container in the predetermined shape.

In one example the controller configured to store a plurality of predetermined shapes, each shape associated with a number, the controller comprising a random number generator, wherein the controller is configured to select a predetermined shape based on a random number generated by the random number generator, and;

wherein the controller is configured to control the sweeper tool to move in the selected predetermined shape.

In one example the sweeper tool is configured to be controlled to move along any one or more of an X axis of the container, a Y axis of the container or rotate around the Z axis of the container.

In one example the predetermined shape may be any one or more of a circle, square, triangle, trapezium or any polygon or any arcuate shape.

In one example the vibrator is controlled to vibrate the container simultaneously as the sweeper tool is moved about the container.

In one example the predetermined shape may be a 2D shape or a 3D shape.

In one example the sweeper tool is moved in linearly along an X axis of the container and a Y axis of the container and rotationally about a Z axis of the container to move sweeper tool in the predetermined shape.

In one example the controller is configured to receive one or more image parameters defining requirements of one or more images.

In one example the sweeper tool is controlled to move within the container based on the predetermined shape and the one or more image parameters.

In one example the image parameters comprise one or more of size, colour palette, stroke density.

An apparatus for generating random images of a herbal formulation of claim 7 comprising a support arm, the sweeper tool removably attachable to the support arm, wherein the support arm is articulable.

In one example the support arm is configured to articulate in six degrees of freedom, and; in use, the support arm movement causing the sweeper tool to move.

In one example the support arm may be an articulating arm. The support arm may be shaped and structured to articulate in six degrees of freedom.

In one example, the sweeper tool may be shaped and structured to articulate in six degrees of freedom. In a further example, the movement or articulation of the arm causes the sweeper tool to move or articulate. In one example, the support arm may be a robotic arm that may be automated.

In one example the apparatus may be an automated apparatus configured to automatically agitate the container and automatically capture a plurality of images. In one example, the controller may be programmed with a script to control the sweeper tool to move in a random movement pattern and control the vibrator to vibrate the container randomly to agitate the contents of the container, and the controller may be configured to control the camera to automatically capture images after the contents of the container have been agitated.

The images may be random images. The randomness of the images may be achieved due to the random vibrations applied by the vibrator and the randomly selected movement patterns of the sweeper tool.

In one example the apparatus is controlled to capture a plurality of images and store the plurality of images. The camera may be controlled to capture an image after each time the contents of the container (e.g., the herbal formulation) is agitated. The contents may be agitated by the sweeper tool moving along a randomly selected movement pattern e.g., a randomly selected shape or by vibrating the container or, by both vibrating the container and moving the sweeper tool as per a random movement pattern.

In one example, the captured images may be used as a training dataset to train a computer model for recognition of a herbal formulation. The captured images or a subset of the captured images may be used as a validation dataset to validate the performance of a computer model used to recognise the herbal formulation.

At least one embodiment of the apparatus for generating random images of a herbal formulation has the advantage that it removes the need for a human to manually capture images to generate a dataset of images. The apparatus may be automated and is advantageous as it provides an automated device to capture multiple images for a dataset to be used to train or validate a computer model.

In accordance with a second aspect, the present invention relates to a method for generating random images of a herbal formulation comprising the steps of:

receiving an input corresponding to a shape, wherein the shape defines a motion pattern of a sweeper tool within a container holding a herbal formulation, wherein the shape is randomly selected from a plurality of predetermined shapes, controlling the sweeper tool to move as per the randomly selected movement pattern within the container to agitate the herbal formulation in the container, capturing an image or controlling a camera to capture an image of the herbal formulation in the container after the sweeper has stopped moving, storing the captured image in a memory unit or a database.

In one example the method for generating random images of a herbal formulation comprising the steps of:

vibrating the container in a random pattern, by a vibrator, receiving a selection of a predetermined shape, wherein the predetermined shape defines the movement pattern of the sweeper tool, controlling the sweeper tool to move according to the predetermined shape, wherein vibrating the container and moving the sweeper tool agitate the contents of the container.

In one example the step of vibrating the container and the step of controlling the sweeper tool to move according to the predetermined shape occur simultaneously to agitate the contents of the container, and; wherein the step of capturing the image is executed after vibration of the container and movement of the sweeper tool have ceased.

In one example the predetermined shape may be a polygon (e.g., a rectangle, square, trapezium etc.) or an arcuate shape (e.g., a circle, ellipse etc.). The predetermined shape may be a 2D shape or a 3D shape, and the sweeper tool may be controlled to move according to the selected shape.

In one example the method steps of the method for generating random images of a herbal formulation are repeated to capture a plurality of images, wherein the images are random images due to the random movement pattern of the sweeper tool.

In one example the method and its steps are repeated multiple times to capture multiple images and the captured images are stored in a memory unit or a database.

In one example the images are random images due to the random movement pattern of the sweeper tool. The captured images may be used as a dataset for training a computer model or for validating performance of a computer model.

The method for generating random images of a herbal formulation may be an automated method. The method may be executed by one or more components of the apparatus. In one example, the method may be executed by a controller of an apparatus for generating random images of a herbal formulation.

In one example herbal formulation may be TCM formulation that comprises one or more herbs. The term herbal formulation may cover a single herb or a mixture of multiple herbs. The herb or herbs may be processed in any suitable manner e.g., grinding, cutting, shredding, powdering etc.

The method for generating random images of a herbal formulation is advantageous because it provides an automated method for generating a set of images that can be used for training or validating a computer model. The automated method generates random images which provides a more robust dataset for training and/or validation.

In accordance with a further aspect, the present invention relates to a controller programmed for carrying out one or more steps or the entire method for generating random images of a herbal formulation as described herein.

In one example the controller may comprise a processor or processing unit and a memory unit. The memory unit may store computer readable instructions that are executable by the processing unit and executing the instructions causes the controller to perform the steps of the method for generating random images of a herbal formulation.

In accordance with a further aspect, the present invention relates to a computer program comprising instructions which, when the program is executed by a controller or computer, cause the controller or computer to carry out the method for generating random images of a herbal formulation.

In accordance with a further aspect, the present invention relates to a computer-readable medium comprising instructions which, when executed by a controller or computer, cause the controller or computer to carry out the method for generating random images of a herbal formulation as described herein.

The term "comprising" (and its grammatical variations) as used herein are used in the inclusive sense of "having" or "including" and not in the sense of "consisting only of".

The term computer model refers to a mathematical model or a program or software that analyses datasets to find patterns and make predictions or decisions. These models can be used on previously unseen data to find patterns, make predictions and/or make decisions. The terms AI model, machine learning model or neural network etc. may be interchangeably used to refer to a computer model.

It is to be understood that, if any prior art information is referred to herein, such reference does not constitute an admission that the information forms a part of the common general knowledge in the art, in any country.

BRIEF DESCRIPTION OF THE DRAWINGS

Embodiments of the present invention will now be described, by way of example, with reference to the accompanying drawings in which.

DETAILED DESCRIPTION OF ILLUSTRATIVE EMBODIMENTS

TCM generally includes multiple practices. Some of the key practices are acupuncture, cupping therapy (bá guàn liáo fǎ), Gua sha, Tai Chi, Massage, Herbal remedies and Moxibustion (i.e., burning of herbs near the body). Herbal formulations play a key part in TCM. TCM formulations comprise multi herb formulations. More specifically, TCM formulations generally comprise multiple herbs that are processed in specific ways and combined in specific quantities or ratios. For the purposes of this description, the term "herbs" or "herbal" refers to Chinese medicinal compounds, or any materials or substances suitable for use in TCM practice, or medicinal compounds, or any materials or substances suitable for use in any therapeutic or dietary treatments or programs. Such therapeutic or dietary treatments or programs are not limited to TCM practice but may include other types of traditional or modern medicinal practice, health and well-being, dietary or psychology or psychiatry programs or treatments, as well as treatments for humans or veterinary treatment for animals. The compounds, materials or substances may also be in an unprocessed formed (e.g. picked plant or fungi materials, cut from animals, etc), semi-processed form (lightly processed materials that have been cut, dried or preserved, etc), in a processed form (medicinal compounds processed in powder form, pellet form, tablet form, or mixed with other compounds or materials, etc), or any combination of the above.

Figure 1:
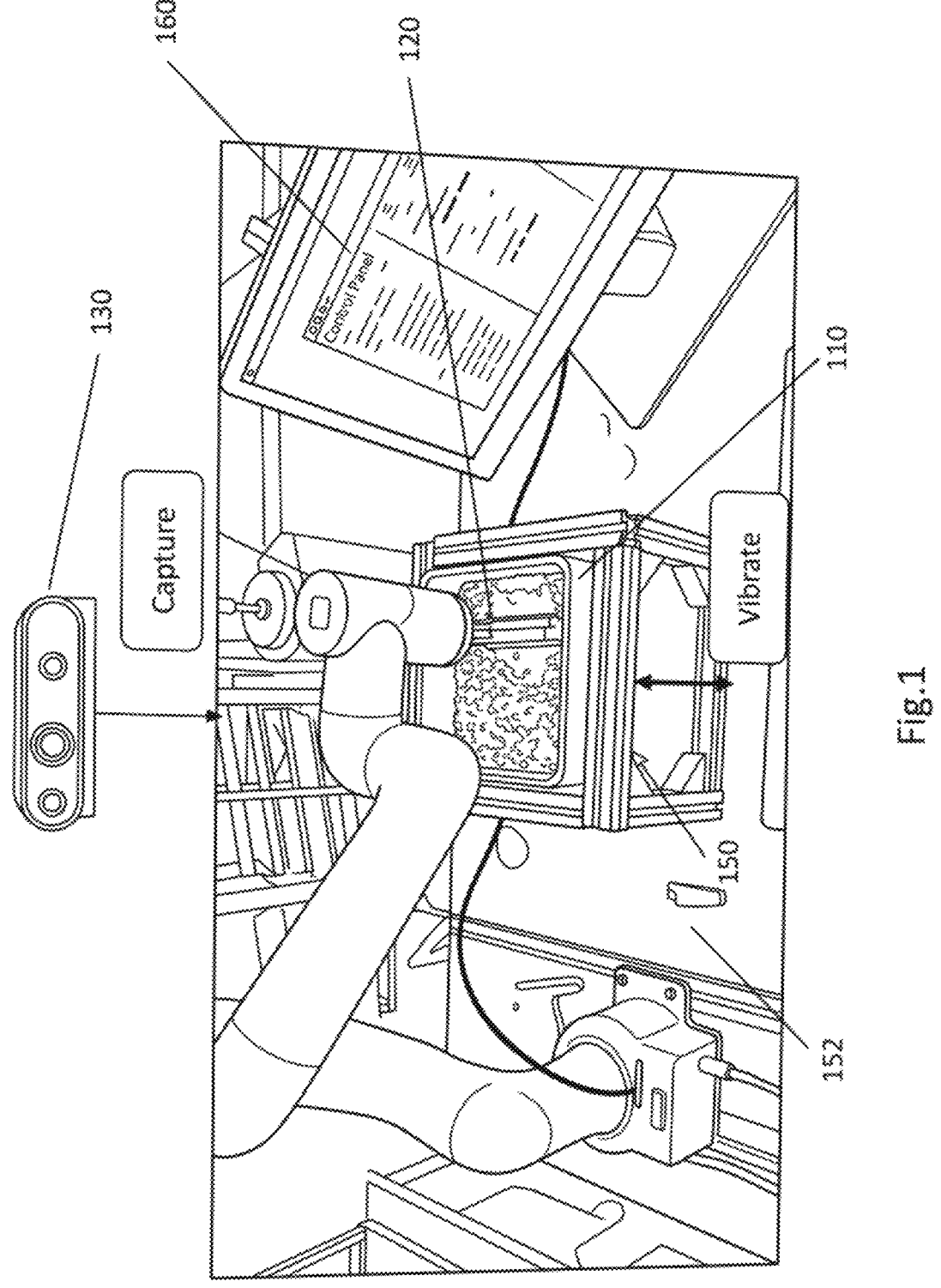
FIG. 1 is an image illustrating one example embodiment of an apparatus for generating random images of a herbal formulation.

Referring to FIG. 1, an embodiment of the present invention is illustrated. This embodiment is arranged to provide an apparatus for generating random images of a herbal formulation comprising:

a container to hold a herbal formulation, a sweeper tool moveable in multiple degrees of freedom, a controller operatively coupled to the sweeper tool and configured to control the movement of the sweeper tool, a camera positioned to capture an image of the herbal formulation within the container, wherein in use, the sweeper tool is moveable within the container based on one or more randomly generated movement patterns to agitate the herbal formulation within the container, and;

wherein the camera is controlled to capture an image of the herbal formulation within the container after the sweeper tool has stopped moving.

The apparatus for generating may comprise a vibrator, wherein the vibrator being attached to the container and configured to vibrate the container to vibrate the herbal formulation within the container. The vibrator and the sweeper tool may be simultaneously controlled to agitate the contents (i.e., the herbal formulation) in the container. The camera may be controlled to capture multiple images. The captured images may be stored in a memory unit or database and may form a dataset used to train or validate a computer model. The camera may be controlled to capture an image after each time the container is agitated by the sweeper tool and/or by the vibrator. The captured images may be random images due to the random agitation due to the random movement by the sweeper tool and/or random vibrations applied by the vibrator.

Figure 2:
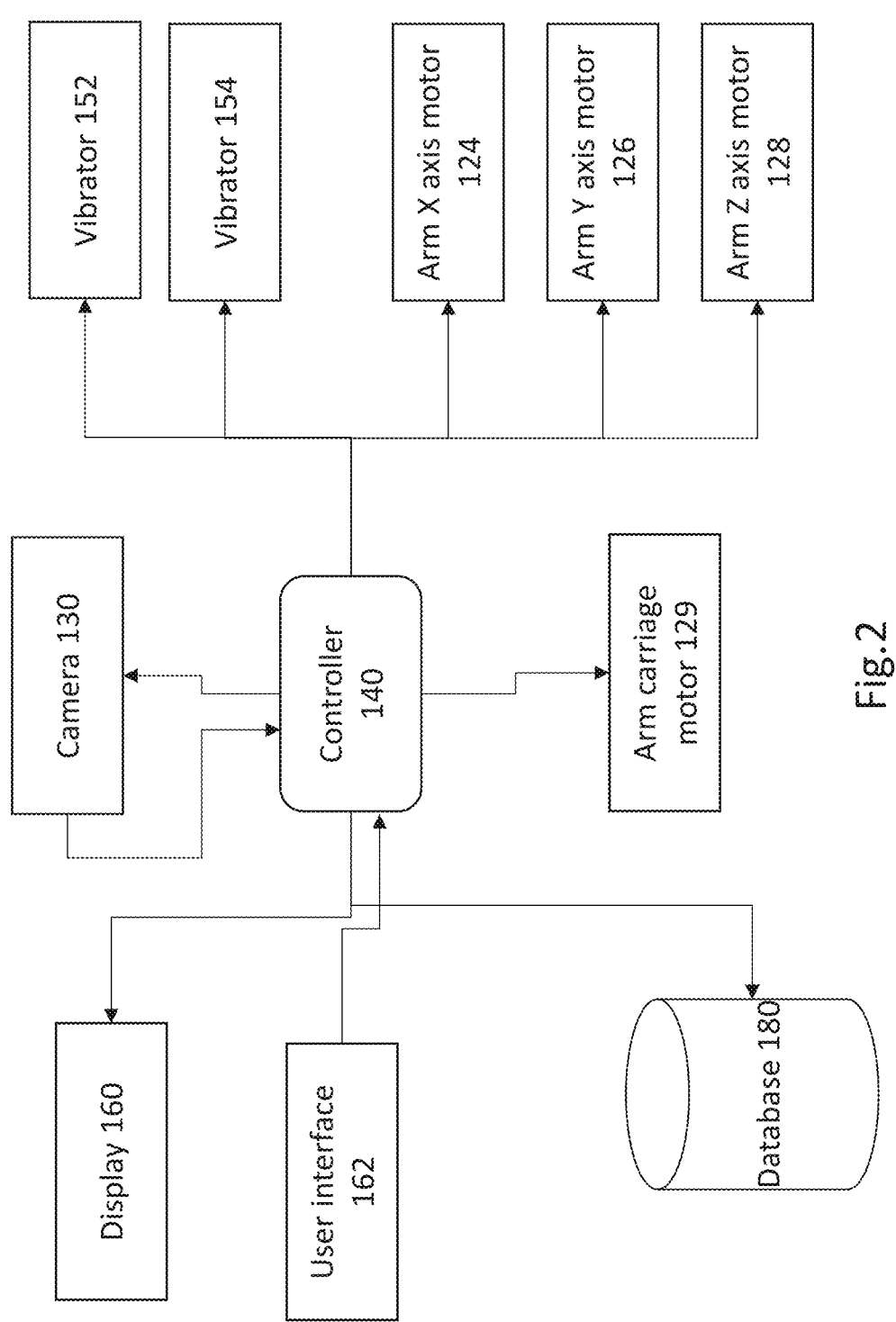
FIG. 2 is a control schematic diagram illustrating the controller of the apparatus of FIG. 1 and its connections to other components.

Referring to FIG. 1, the apparatus 100 for generating random images of a herbal formulation e.g., a Traditional Chinese Medicine (TCM) formulation comprises a container 110 to retain a herbal formulation e.g., A TCM formulation, a sweeper tool 120, a camera 130, a controller 140. The camera 130 is configured to capture images of the herbal formulation in the container 110. Optionally the apparatus 100 may comprise a display 160. The display 160 may be adapted to present data to a user. The display 160 may be a touch screen. FIG. 2 illustrates a control schematic and shows the operative connections between the controller and other components.

In one example, the controller 140 is operatively coupled to the sweeper tool 120 and configured to control the movement of the sweeper tool. The camera 130 is positioned to capture an image of the herbal formulation within the container 110. The camera 130 may be mounted on a frame or a gimbal or may be handheld. In use, the sweeper tool 120 is moveable within the container 110 based on one or more randomly generated movement patterns to agitate the herbal formulation within the container 110. In use, the camera 130 is controlled to capture an image of the herbal formulation within the container after the sweeper tool has stopped moving.

The container 110 may be a pan or a bowl or plate or a flat bottom box. In the illustrated example of FIG. 1, the container is substantially square shaped box. The container 110 preferably may comprise a flat bottom or a flat base. The container 110 may be any suitable shape and is adapted to retain the herbal formulation. The sweeper tool is also moveable within the container 110 to move or agitate the herbal formulation.

The apparatus 100 may comprise a vibrator. The vibrator may be attached to the container 110. In another form the container 110 may be located on and supported by the vibrator. In one example the vibrator may be configured to vibrate the container 110 to vibrate or agitate or move the herbal formulation within the container. In one example the vibrator is controlled to vibrate the container in a random pattern. In one example, the vibrator may vibrate the container such that the container moves about at least two or three axes. In an alternate example vibrator may move the container along one axis. In one example the vibrator is controlled to randomly vibrate the container.

As shown in the illustrated embodiment, the apparatus 100 comprises a vibrator system 150 defined by a plurality of vibrators 152, 154. The apparatus 100 may comprise at least two vibrators but may alternatively comprise any suitable number of vibrators. The vibrators 152, 154 are operatively coupled to the controller 140, as shown in FIG. 2.

The controller 140 is configured to control the operation of the vibrators 152, 154. The vibrators 152, 154 may be controlled to generate different patterns of the herbal formulation (e.g., TCM formulation) within the container 110. The controller 140 may be configured to control the vibrators 152, 154 to operate independently to generate different patterns of vibrations that are applied to the container to agitate the herbal formulation with the container. The vibrators 152, 154 may be controlled to randomly vibrate to cause agitation of the herbal formulation.

In one example, the controller 140 may be configured to independently control the vibrators 152, 154 independently controlled to vibrate the container 110 to generate patterns within the herbal formulation. The patters within the herbal formulation may include one or more of flattened without overlap, slightly overlapped, heavily overlapped (e.g., with layer upon layer) or mountain shaped layers. Other patterns are also contemplated. These patterns may be preprogrammed into the controller. Each pattern may be generated by a predefined vibration movement by each vibrator 152, 154. In one example a user may specify the required pattern to be created. In another example, the controller may randomly select the pattern to be created and control the vibrators accordingly. In a further example, the controller 140 may randomly control the vibrators such that the vibrators 152, 154 randomly vibrated to agitate the formulation in the container 110.

In one example the vibrators 152, 154 may be activated for a predefined time such that the container 110 is vibrated for a predefined time. The predefined time may be a random time selected from within a predefined time range, wherein the predefined time range includes a minimum time and a maximum time. In another example, the predefined time may be user set. A user may input the required time via a user interface 162. The user interface may be part of the display 160 or may be a separate component. The user interface 162 may comprise a touch surface or buttons or knobs or a combination thereof.

The sweeper tool 120 is configured to be locatable within the container 110. The sweeper tool 120 is moveable in multiple degrees of freedom. In one example the sweeper tool 120 is moveable in six degrees of freedom e.g., linear movements in four directions and rotation in two directions. The sweeper tool 120 may comprise a member that is adapted to be moved through the herbal formulation to move or agitate the formulation. The sweeper tool 120 may comprise a brush or wiper or stick or spoon or scoop or other suitable shape. In the illustrated example the sweeper tool 120 comprises a flat wiper.

In one example the sweeper tool 120 may be attached to one or more motors that may be configured to move the sweeper tool within the container 110. The motors may be controlled by the controller 140. Each motor may control the sweeper tool move in two degrees of freedom.

For example, the sweeper tool 120 may comprise an X axis motor, a Y axis motor, and a Z axis motor. Each motor is configured to control the movement of the sweeper tool 120 along each axis. For example, the X axis motor may be controlled to move the sweeper tool axially along the X axis of the container 110, the Y axis motor may be controlled to move the sweeper axially along the Y axis of the container and the Z axis motor may be controlled to rotate the sweeper tool 120 about the Z axis of the container 110.

In one example, the sweeper tool 120 is configured to move linearly along an X axis of the container and a Y axis of the container and rotationally about a Z axis of the container to move sweeper tool in the predetermined shape.

The apparatus 100 may comprise a support arm 122. The sweeper tool 120 may be removably attachable to the support arm 122. The support arm 122 is articulable. The support arm 122 may be configured to articulate in six degrees of freedom. In use, the support arm 122 movement causes the sweeper tool 120 to move within the container to move or agitate the formulation in the container 110.

The support arm 122 may be disposed on a carriage 123. The carriage 123 is configured to move axially relative to the container 110. As shown in FIG. 1, the carriage 123 is positioned on rails 170, 172. The carriage 124 is moveable on the rails to move the support arm 122 axially relative to the container.

In one example, the support arm 122 may comprise one or more actuators that are configured to articulate the arm 122. The articulation or movement of the support arm 122 causes the sweeper tool 120 to articulate or move. The actuators may be controlled by the controller 140. In one example the actuators are motors and the support arm 122 may comprise three motors. The support arm may comprise an arm X motor 124, an arm Y axis motor 126 and an arm Z axis motor 128. The support arm 122 further comprises one or more joints, and the actuators (e.g., motors) are configured to move parts of the support arm at the joints.

The support arm 122 further comprises an arm carriage motor 129 that is configured to drive the carriage along the rails 170, 172. The carriage motor 129 may be any suitable motor that is adapted to control the wheels of the carriage to move the carriage along the rails 170, 172.

Referring to FIG. 2, the controller 140 is operatively coupled to a plurality of components. The controller 140 may comprise a processor or processing unit and one or more memory units. For example, the controller 140 may comprise a Central Processing Unit (CPU), Math Co-Processing Unit (Math Processor), Graphic Processing Unit (GPUs) or Tensor processing unit (TPUs) for tensor or multi-dimensional array calculations or manipulation operations. The one or more memory units may comprise read-only memory (ROM), random access memory (RAM), and input/output devices such as disk drives. The one or more memory units may each be a computer readable medium or a machine readable medium. The memory units may be configured to store data e.g., a script or program that can be executed by the controller to control the actions of the various components of the apparatus.

Optionally the controller 140 may comprise input devices 110 such as an Ethernet port, a USB port, etc. Optionally, the controller 140 may further include one or more communication modules to allow for wireless communication between the controller 140 and other devices.

The controller 140 may be implemented by any computing architecture e.g., a microprocessor or a microcontroller architecture. The controller 140 may further be programmable with software to control operations of the controller and operations of the components that are controlled by the controller 140. The controller 140 may be programmed with a script to cause the controller to perform one or more methods.

In alternative configurations the controller 140 may be implemented by other suitable computing architectures, including portable computers, tablet computers, stand-alone Personal Computers (PCs), smart devices, Internet of Things (IoT) devices, edge computing devices, client/server architecture, "dumb" terminal/mainframe architecture, cloud-computing based architecture, or any other appropriate architecture. The controller 140 may be appropriately programmed to implement a method for generating random images.

The controller 140 is operatively coupled to the user interface 162 and configured to receive inputs from a user. The controller 140 may output information to a user via the user interface 162. The controller 140 is operatively coupled to the display 160 and configured to output information to the display 160. As shown in FIG. 2, the controller 140 is electrically coupled to the arm carriage motor 129 and configured to control the arm carriage motor 129 to move the support arm into place.

Referring to FIG. 2, the controller 140 is operatively coupled to the vibrators 152, 154. The controller may be configured to independently control the vibrators 152, 154 or may simultaneously control the vibrators 152, 154. The controller 140 is configured to control the vibrators 152, 154 to vibrate the container 110 to generate different patterns of the herbal formulation in the container. The controller 140 is operatively coupled to the arm X axis motor 124, the arm Y axis motor 126 and the arm Z axis motor 128. Alternatively, the X, Y and Z axis motors may be sweeper tool motors that are directly coupled to it and controlled by the controller.

In use, a user may define a plurality of parameters for image generation. The image n parameters may define the characteristics the random images are required to have such as for example, size, resolution, colour palette, stroke density and other relevant factors. The image parameters may be received via the user interface 162. The selected image parameters may be displayed on the display 160.

In one example the sweeper tool is controlled to move within the container based on the predetermined shape and the one or more image parameters.

The controller 140 is configured to control the motors to move the support arm. The sweeper tool 120 is configured to move in a movement pattern that corresponds to a predetermined shape. The sweeper tool 120 may be moved in a predetermined shape within the container 110. The controller 140 is configured to store a plurality of predetermined shapes. Each shape is associated with a number. The controller 140 comprises a random number generator e.g., a software random number generator. The controller is configured to generate a random number and determine the corresponding shape. The controller 140 is configured to control the three motors 124, 126, 128 to cause the sweeper tool to move in the selected predetermined shape. The The predetermined shape may be 2D shape or a 3D shape. In one example the predetermined shape may be any one or more of a circle, square, triangle, trapezium or any polygon or any arcuate shape.

The controller 140 is configured to define motion patterns that will be applied to create the selected shape. The controller 140 is configured to determine different combinations of linear motion along the X, Y and Z axes of the container. The motions to cause the sweeper tool 120 to move relative to the container are determined.

Figure 4:
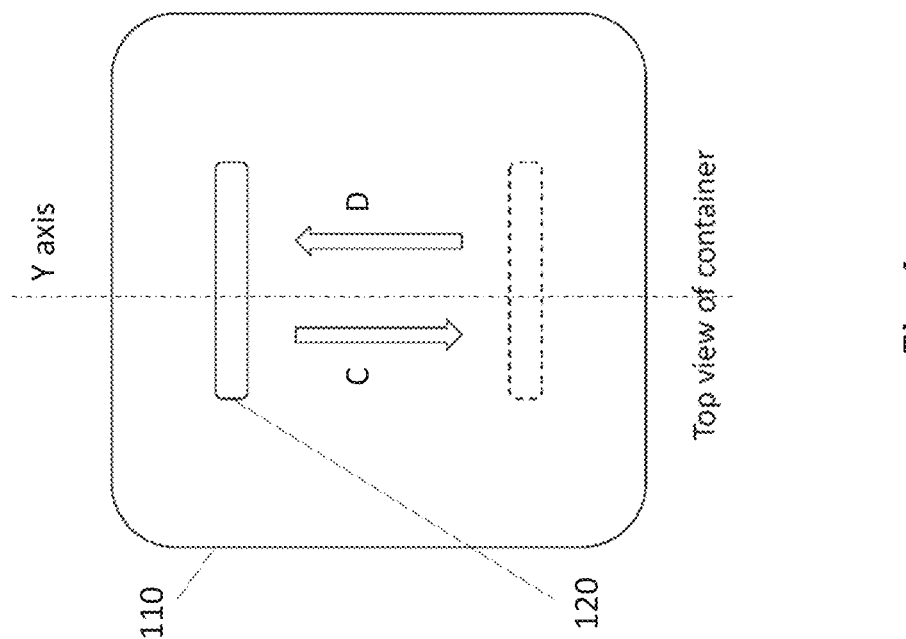
FIG. 4 illustrates a top view of the container of the apparatus of FIG. 1 and motion of the sweeper tool along the Y axis.
Figure 3:
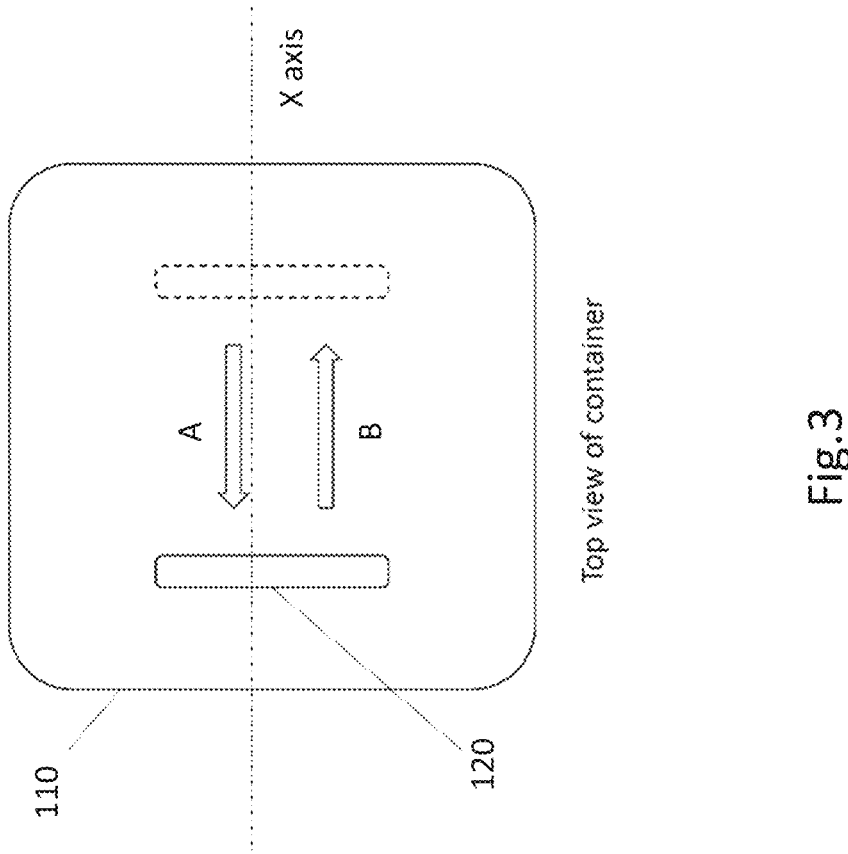
FIG. 3 illustrates a top view of the container of the apparatus of FIG. 1 and motion of the sweeper tool along an X axis.
Figures 5, 6:
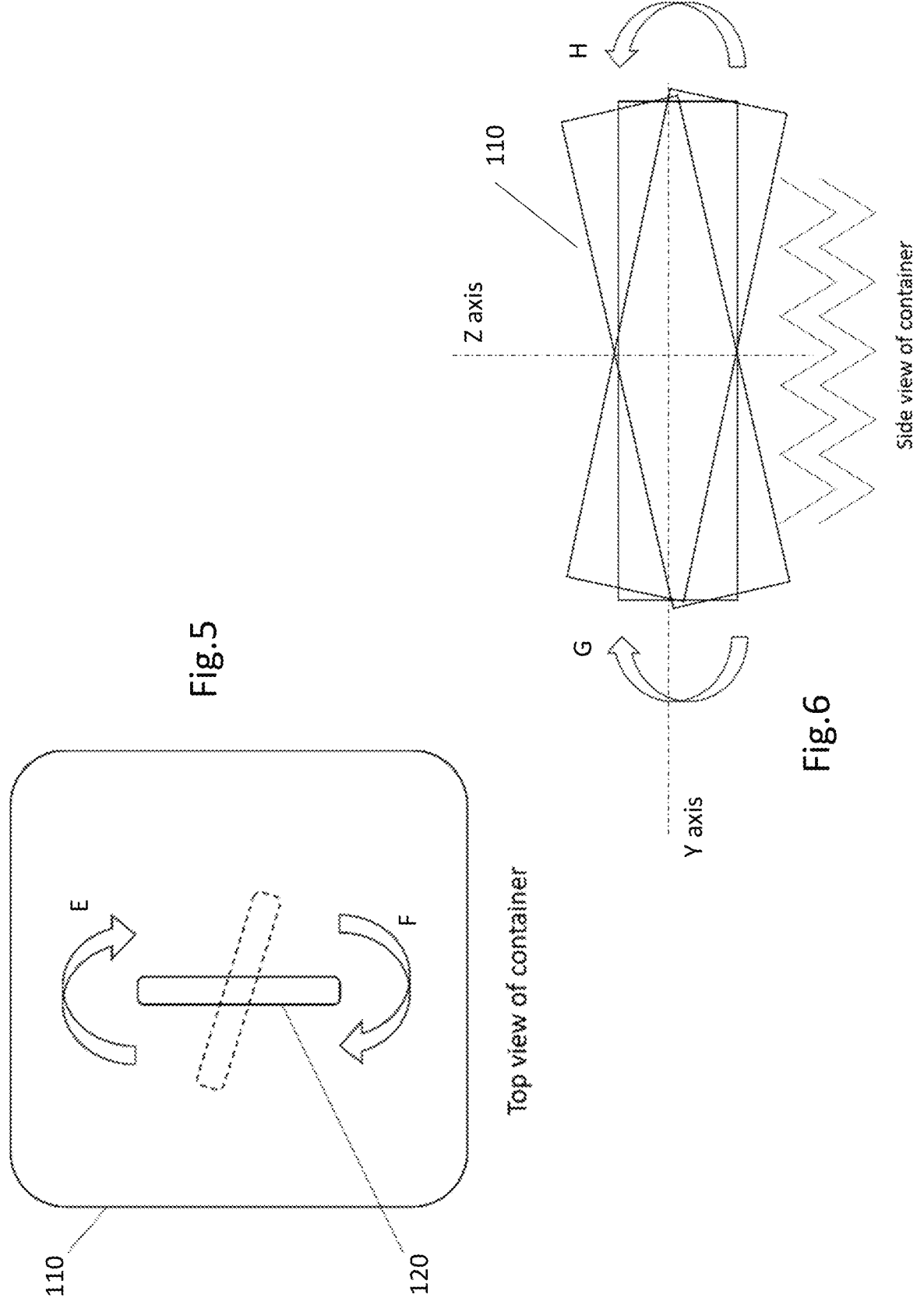
FIG. 5 illustrates a top view of the container and motion of the sweeper tool about the Z axis.
FIG. 6 illustrates a side view of the container and vibrations applied to the container.

FIGS. 3 to 5 illustrate various motions of the sweeper tool. Referring to FIG. 3 a view of the container 110 from the top view is shown and the sweeper tool 120 moving axially along an X axis is shown. The sweeper tool 120 may be configured to move back and forth along the X axis of the container 110. Arrows A and B denote the two degrees of freedom i.e., the two directions of travel along the X axis. FIG. 3 illustrates the tool being moveable in two positions in solid line and dashed lines.

FIG. 4 illustrates a top view of the container 110 and the sweeper tool moving along a Y axis. The sweeper tool 120 may be configured to move back and forth along the Y axis of the container 110. Arrows C and D denote the direction of travel of the tool along the Y axis. FIG. 4 illustrates the tool being moveable in two positions in solid line and dashed lines.

FIG. 5 illustrates motion about the Z axis of the container. The Z axis is extending out of the page. The sweeper tool 120 is configured to be rotated about the Z axis. The sweeper tool 120 may be controlled to move in the predetermined shape by moving the sweeper tool in a combination of motions in the X, Y and Z axes. The arrows E and F illustrate the directions of rotation of the tool 120. The tool is shown in two configurations in rotation in solid line and dashed line.

In one example the controller 140 may be configured to control the motors 124, 126, 128 to move the support arm 122 in an appropriate motion such that the motion of the support arm causes the sweeper tool 120 to move in the selected shape.

Optionally, the controller 140 may be configured to randomly generate variations to the motion within the predetermined shape to introduce variability. The controller 140 may change the motion in one or more axes of the predetermined shape randomly by a particular variable e.g., the X movement may be shortened or lengthened to introduce variability in the motion of the sweeper tool 120.

FIG. 6 illustrates a side view of the container 110 and illustrates the vibration applied to the container 110. As seen in FIG. 6, the vibration applied may be in two dimensions. In the illustrated example, the container is vibrated by one or more vibrators to vibrate about an X or Y axis, i.e., rotate about an X or Y axis. As shown in FIG. 6, the arrows E and F denote the motion of the vibrations. FIG. 6 illustrates the container as it is vibrating.

In another example, the vibrators may be controlled to vibrate the container axially i.e., parallel to an X axis or Y axis. The controller 140 may be configured to randomly control the vibrators 152, 154 to randomly vibrate the container 110. In one example the vibrator (or vibrators) is controlled to vibrate the container simultaneously as the sweeper tool is moved about the container. The support arm 122 may be a robotic arm e.g., as shown in FIG. 1, and may be automated (i.e., automatically controlled by the controller 140) to move as per the selected shape.

The controller 140 may be configured to control operation of the camera 130. The camera 130 may be configured to capture multiple images of the herbal formulation in the container 110. The camera 130 may be controlled to capture an image each time after the sweeper tool has moved according to the randomly generated motion pattern such that the captured images are random images.

In one example the apparatus 100 comprises a database 180 to store captured images. The database may be stored in a memory unit of the controller. Alternatively, the database 180 may be stored in a cloud network or a remote memory unit. The camera is controlled to capture multiple images and store them into the database 180. The captured images may be random images. The randomness of the images may be achieved due to the random vibrations applied by the vibrator and the randomly selected movement patterns of the sweeper tool 120. In one example, the captured images may be used as a training dataset to train a computer model for recognition of a herbal formulation. The captured images or a subset of the captured images may be used as a validation dataset to validate the performance of a computer model used to recognise the herbal formulation.

In use, the camera may be controlled to capture an image after each time the contents of the container (e.g., the herbal formulation) is agitated. The contents may be agitated by the sweeper tool 120 moving along a randomly selected movement pattern e.g., a randomly selected shape or by vibrating the container 110 by a vibrator 152, 154 or, by both the container and moving the sweeper tool as per a random movement pattern. The number of images to be captured may be defined within the image parameters.

In use, the apparatus may be an automated apparatus configured to automatically agitate the container and automatically capture a plurality of images. In one example, the controller 140 may be programmed with a script to control the support arm 122 to move the sweeper tool 120 in a random movement pattern and control the vibrator 152, 154 to vibrate the container randomly to agitate the contents of the container. In use, the controller 140 may be configured to control the camera 130 to automatically capture images after the contents of the container have been agitated. The camera 130 may be controlled to capture a predefined number of images.

Figure 7:
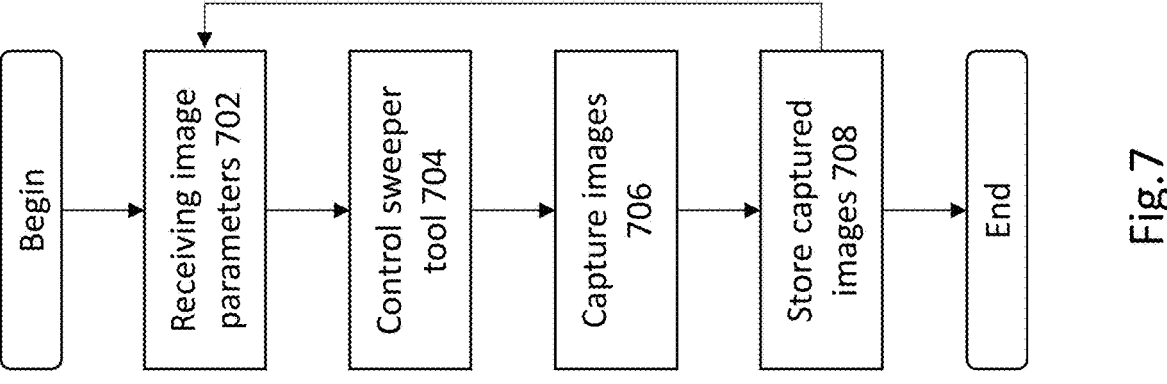
FIG. 7 illustrates a flow chart of an example embodiment of a method for generating random images of a herbal formulation.

Referring to FIG. 7, an embodiment of the present invention is illustrated. This embodiment is arranged to provide a method 700 for generating random images of a herbal formulation comprising the steps of: receiving 702 one or more image parameters, controlling 704 a sweeper tool to agitate a herbal formulation in the container in random movement patterns, capturing 706 one or more images of the herbal formulation after the sweeper tool has stopped moving and storing 708 the captured images. The method 700 may be executed by the apparatus 100 for generating random images. The method 700 may be repeated until a specified number of images are captured.

Figure 8:
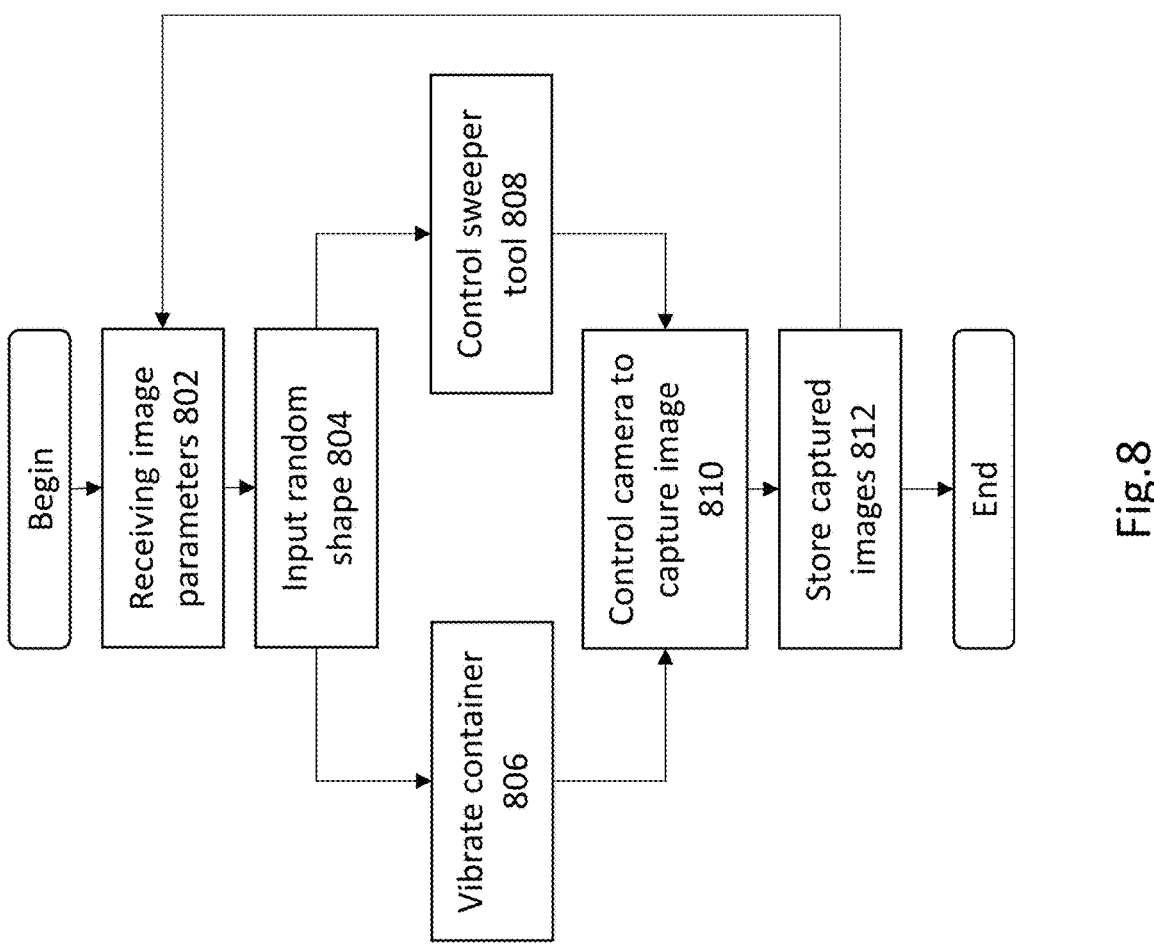
FIG. 8 illustrates a further embodiment of a method for generating random images of a herbal formulation.

FIG. 8 illustrates a further embodiment of a method 800 of generating random images of a herbal formulation (e.g., a TCM formulation). The method 800 comprises step 802. Step 802 comprises receiving one or more image parameters defining characteristics of the images. The image parameters may also define the number of images to be captured.

Step 804 comprises receiving an input corresponding to a shape, wherein the shape defines a motion pattern of a sweeper tool 120 within a container holding a herbal formulation. The shape is randomly selected from a plurality of predetermined shapes. Each shape may correspond to a number and the method comprises generating a random number to randomly select a shape.

Step 806 comprises vibrating the container in a random pattern by a vibrator 152, 154. Step 808 comprises controlling the sweeper tool 120 to move as per the randomly selected movement pattern within the container to agitate the herbal formulation in the container. Steps 806 and 808 may be performed simultaneously. In use, the container and its contents may be agitated by simultaneously vibrating the container by the vibrator and by moving the sweeper tool 120 within the container.

Step 810 comprises controlling a camera 130 to capture an image of the herbal formulation in the container after agitation is complete. The camera 130 to capture an image of the agitated herbal formulation after the sweeper has stopped moving and the vibrator has stopped vibrating the container 110.

Step 812 comprises storing the captured image in a database 180. The captured image may optionally be saved in a memory unit. The steps of method 800 may be repeated multiple times to capture and store a specified number of images. The specified number of images can be used to create a training dataset or a validation dataset for a computer model e.g., a machine learning model.

In one example the predetermined shape may be a polygon (e.g., a rectangle, square, trapezium etc.) or an arcuate shape (e.g., a circle, ellipse etc.). The predetermined shape may be a 2D shape or a 3D shape, and the sweeper tool may be controlled to move according to the selected shape. The images are random images produced by the method 700 or 800 are random due to the random movement pattern of the sweeper tool and/or due to the randomness of the vibrations applied to the container.

In an optional alternative, steps 806 and 808 may be performed in sequence. For example, the container may be vibrated first and then the sweeper tool may be moved. In another example, step 808 may be performed first followed by step 806. In another example, only step 808 (i.e., movement of the sweeper tool 120) may be performed and step 806 may be skipped. In a further alternative the container may only be vibrated by step 806 and step 808 may be skipped.

In one example the images are random images due to the random movement pattern of the sweeper tool. The captured images may be used as a dataset for training a computer model or for validating performance of a computer model.

The method for generating random images of a herbal formulation may be an automated method. The method may be executed by one or more components of the apparatus. In one example, the method may be executed by a controller of an apparatus for generating random images of a herbal formulation.

In one example herbal formulation may be TCM formulation that comprises one or more herbs. The term herbal formulation may cover a single herb or a mixture of multiple herbs. The herb or herbs may be processed in any suitable manner e.g., grinding, cutting, shredding, powdering etc.

The method for generating random images of a herbal formulation is advantageous because it provides an automated method for generating a set of images that can be used for training or validating a computer model. The automated method generates random images which provides a more robust dataset for training and/or validation.

The apparatus and method described herein are advantageous because they remove the need for a human to manually capture images to generate a dataset of images. The apparatus may be automated and is advantageous as it provides an automated device to capture multiple images for a dataset to be used to train or validate a computer model. The apparatus and method automatically generate many random images which provides a large and robust dataset for training computer models.

The apparatus is advantageous because it can produce randomness in the herbal formulation by using at least two mechanisms (the sweeper tool and vibrators). Both the sweeper tool and vibrators may be used simultaneously to further create randomness of the herbal formulation. The increased randomness in the container is captured in the images. The randomness in the captured images results in a more robust dataset.

It will also be appreciated that where the methods and systems of the present invention are either wholly implemented by computing system or partly implemented by computing systems then any appropriate computing system architecture may be utilised. This will include stand-alone computers, network computers and dedicated hardware devices. Where the terms "computing system" and "computing device" are used, these terms are intended to cover any appropriate arrangement of computer hardware capable of implementing the function described.

The phrases 'computer-readable medium' or 'machine-readable medium' should also be taken to include any medium that is capable of storing, encoding or carrying a set of instructions for execution by a processor of a computing device and that cause the processor to perform any one or more of the methods described herein. The computer-readable medium is also capable of storing, encoding, or carrying data structures used by or associated with these sets of instructions. The phrases 'computer-readable medium' and 'machine readable medium' include, but are not limited to, portable to fixed storage devices, solid-state memories, optical media or optical storage devices, magnetic media, and/or various other mediums capable of storing, containing, or carrying instruction(s) and/or data. The 'computer-readable medium' or 'machine-readable medium' may be non-transitory.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

What is claimed is:

1. An apparatus for generating random images of a herbal formulation comprising:

a container to hold a herbal formulation, a sweeper tool moveable in multiple degrees of freedom, a controller operatively coupled to the sweeper tool and configured to control the movement of the sweeper tool, a camera positioned to capture an image of the herbal formulation within the container, wherein in use, the sweeper tool is moveable within the container based on one or more randomly generated movement patterns to agitate the herbal formulation within the container, and;

wherein the camera is controlled to capture an image of the herbal formulation within the container after the sweeper tool has stopped moving.

2. An apparatus for generating random images of a herbal formulation of claim 1 further comprising a vibrator, wherein the vibrator is attached to the container and configured to vibrate the container to agitate the herbal formulation within the container.

3. An apparatus for generating random images of a herbal formulation of claim 2, wherein the vibrator is controlled to vibrate the container in a random pattern.

4. An apparatus for generating random images of a herbal formulation of claim 1, wherein the camera is configured to capture multiple images of the herbal formulation, the camera being configured to capture an image each time after the sweeper tool has moved according to the randomly generated motion pattern such that the captured images are random images.

5. An apparatus for generating random images of a herbal formulation of claim 3, wherein the apparatus comprises a plurality of vibrators, the vibrators are operatively coupled to the controller, and the controller is configured to control the vibrators to operate independently to generate different patterns of vibrations that are applied to the container to agitate the herbal formulation with the container.

6. An apparatus for generating random images of a herbal formulation of claim 2, wherein the movement patterns define a predetermined shape, and the sweeper tool is moved in a predetermined shape.

7. An apparatus for generating random images of a herbal formulation of claim 6, the controller configured to store a plurality of predetermined shapes, each shape associated with a number, the controller comprising a random number generator, the controller configured to select a predetermined shape based on a random number generated by the random number generator, and;

the controller configured to control the sweeper tool to move in the selected predetermined shape.

8. An apparatus for generating random images of a herbal formulation of claim 7, wherein the sweeper tool is configured to be controlled to move along any one or more of an X axis of the container, a Y axis of the container or rotate around the Z axis of the container.

9. An apparatus for generating random images of a herbal formulation of claim 7, wherein the predetermined shape may be any one or more of a circle, square, triangle, trapezium, or any polygon.

10. An apparatus for generating random images of a herbal formulation of claim 7, wherein the vibrator is controlled to vibrate the container simultaneously as the sweeper tool is moved about the container.

11. An apparatus for generating random images of a herbal formulation of claim 7, wherein the predetermined shape may be a 2D shape or a 3D shape.

12. An apparatus for generating random images of a herbal formulation of claim 8, wherein the sweeper tool is moved in linearly along an X axis of the container and a Y axis of the container and rotationally about a Z axis of the container to move sweeper tool in the predetermined shape.

13. An apparatus for generating random images of a herbal formulation of claim 7, wherein the controller is configured to receive one or more image parameters defining requirements of one or more images.

14. An apparatus for generating random images of a herbal formulation of claim 13, wherein the sweeper tool is controlled to move within the container based on the predetermined shape and the one or more image parameters.

15. An apparatus for generating random images of a herbal formulation of claim 14, wherein the image parameters comprise one or more of size, colour palette, stroke density.

16. An apparatus for generating random images of a herbal formulation of claim 7, comprising a support arm, the sweeper tool removably attachable to the support arm, wherein the support arm is configured to articulate in six degrees of freedom, and;

in use, the support arm movement causing the sweeper tool to move.

17. A method for generating random images of a herbal formulation comprising the steps of:

(1) receiving an input corresponding to a shape, wherein the shape defines a motion pattern of a sweeper tool within a container holding a herbal formulation, wherein the shape is randomly selected from a plurality of predetermined shapes, (2) controlling the sweeper tool to move as per the randomly selected movement pattern within the container to agitate the herbal formulation in the container, (3) capturing an image or controlling a camera to capture an image of the herbal formulation in the container after the sweeper has stopped moving, (4) storing the captured image in a memory unit or a database.

18. A method for generating random images of a herbal formulation of claim 17 further comprising the steps of:

vibrating the container in a random pattern, by a vibrator, receiving a selection of a predetermined shape, wherein the predetermined shape defines the movement pattern of the sweeper tool, controlling the sweeper tool to move according to the predetermined shape, wherein vibrating the container and moving the sweeper tool agitate the contents of the container.

19. A method for generating random images of a herbal formulation of claim 18, wherein the step of vibrating the container and the step of controlling the sweeper tool to move according to the predetermined shape occur simultaneously to agitate the contents of the container, and;

wherein the step of capturing the image is executed after vibration of the container and movement of the sweeper tool have ceased.

20. A method for generating random images of a herbal formulation of claim 19, wherein the steps (1), (2), (3), and (4) are repeated to capture a plurality of images, wherein the images are random images due to the random movement pattern of the sweeper tool.

* * * * *